(12) United States Patent
Hong

(10) Patent No.: US 12,490,164 B2
(45) Date of Patent: Dec. 2, 2025

(54) CELL HANDOVER OR RESELECTION METHOD, COMMUNICATION DEVICE AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 329 days.

(21) Appl. No.: 18/265,898

(22) PCT Filed: Dec. 8, 2020

(86) PCT No.: PCT/CN2020/134676
§ 371 (c)(1),
(2) Date: Jun. 7, 2023

(87) PCT Pub. No.: WO2022/120601
PCT Pub. Date: Jun. 16, 2022

(65) Prior Publication Data
US 2024/0040457 A1    Feb. 1, 2024

(51) Int. Cl.
*H04W 36/08* (2009.01)
*H04W 36/00* (2009.01)
*H04W 36/32* (2009.01)
*H04W 36/36* (2009.01)
*H04W 84/06* (2009.01)

(52) U.S. Cl.
CPC ... *H04W 36/083* (2023.05); *H04W 36/00835* (2018.08); *H04W 36/322* (2023.05); *H04W 36/362* (2023.05); H04W 84/06 (2013.01)

(58) Field of Classification Search
CPC ........... H04W 36/00837; H04W 36/30; H04W 36/322; H04W 36/362
See application file for complete search history.

(56) References Cited

U.S. PATENT DOCUMENTS

| 5,678,174 | A  |    | 10/1997 | Tayloe |           |
|-----------|----|----|---------|--------|-----------|
| 2021/0136641 | A1 | * | 5/2021 | Roy | H04W 36/249 |
| 2022/0078684 | A1 | * | 3/2022 | Fehrenbach | H04W 36/305 |
| 2022/0368414 | A1 | * | 11/2022 | Kim | H04W 36/0094 |
| 2023/0037533 | A1 | * | 2/2023 | Huang | H04W 36/0085 |
| 2023/0276336 | A1 | * | 8/2023 | Wu | H04W 36/326 370/331 |
| 2023/0337035 | A1 | * | 10/2023 | Cao | H04W 24/10 |
| 2023/0354138 | A1 | * | 11/2023 | Leng | H04W 48/16 |

(Continued)

FOREIGN PATENT DOCUMENTS

| CN | 111182594 A | 5/2020 |
| CN | 111525950 A | 8/2020 |
| CN | 111757411 A | 10/2020 |

OTHER PUBLICATIONS

European Patent Application No. 20964546.4 Search and Opinion Jan. 2, 2024, 14 pages.

(Continued)

*Primary Examiner* — Barry W Taylor
(74) *Attorney, Agent, or Firm* — Cozen O'Connor

(57) ABSTRACT

A cell handover or reselection method, performed by a terminal, including: determining measurement information of a satellite cell based on relative location information between a terminal and a satellite.

26 Claims, 5 Drawing Sheets

(56) References Cited

U.S. PATENT DOCUMENTS

2023/0397032 A1* 12/2023 Yavuz ................. H04W 36/322
2024/0406830 A1* 12/2024 Yan ....................... H04W 24/02

OTHER PUBLICATIONS

3rd Generation Partnership Project;Technical Specification Group Radio Access Network; Solutions for NR to support non-terrestrial networks (NTN)(Release 16), 3GPP TR 38.821 Dec. 2019, 140 pages.
Xiaomi Communications "Discussion on mobility management in NTN" 3GPP TSG RAN WG2 #112, R2-2010446, Nov. 2020, 5 pages.
PCT/CN2020/134676, English translation of International Search Report dated Jul. 14, 2021, 2 pages.

* cited by examiner

CELL HANDOVER OR RESELECTION METHOD, COMMUNICATION DEVICE AND STORAGE MEDIUM

CROSS-REFERENCE TO RELATED APPLICATION

This application is a U.S. national phase of International Application No. PCT/CN2020/134676, filed on Dec. 8, 2020, the entire content of which is incorporated herein by reference.

TECHNICAL FIELD

The embodiments of the disclosure relate to the field of communication including wireless communication, in particular to a cell handover or reselection method, a cell handover or reselection apparatus, a communication device and a storage medium.

BACKGROUND

In wireless communication, Conditional Handover (CHO) has been introduced in the related art, to reduce problems such as connection failure and the like during terminal movement. Through CHO, the network can pre-configure multiple candidate target cells for the terminal and send a handover command to the terminal when network condition is good.

SUMMARY

According to a first aspect of the disclosure, a cell handover or reselection method, applicable to a terminal, is provided. The method includes:
  determining measurement information of a satellite cell based on relative location information between the terminal and a satellite.

According to a second aspect of the disclosure, a cell handover or reselection method, applicable to a base station, is provided. The method includes:
  receiving measurement information of a satellite cell transmitted by a terminal based on relative location information between the terminal and a satellite.

According to a third aspect of the disclosure, a communication device is provided. The communication device at least includes: a processor and a memory for storing executable instructions capable of running on the processor, in which,
  the processor is configured to perform the steps of the above cell handover or reselection methods when running the executable instructions.

According to a fourth aspect of the disclosure, a non-transitory computer-readable storage medium having computer-executable instructions stored thereon is provided. When the computer-executable instructions are executed by a processor, the steps of the above cell handover or reselection methods are implemented.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms "first", "second", "third", and the like may be used in this disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

For Non-Terrestrial Network (NTN), the traditional handover method is not suitable for a Non-Terrestrial Network (NTN) system due to the large propagation path and large latency in signal transmission for the NTN. Meanwhile, it is also difficult for the terminal to accurately trigger a measurement reporting mechanism using the CHO method, which tends to cause handover failure.

To solve this problem, the present disclosure provides a cell handover or reselection method and a communication device.

To better describe any embodiment of the disclosure, an exemplary example of a cell handover or reselection application scenario is illustrated in an embodiment of the disclosure.

Figure 1:
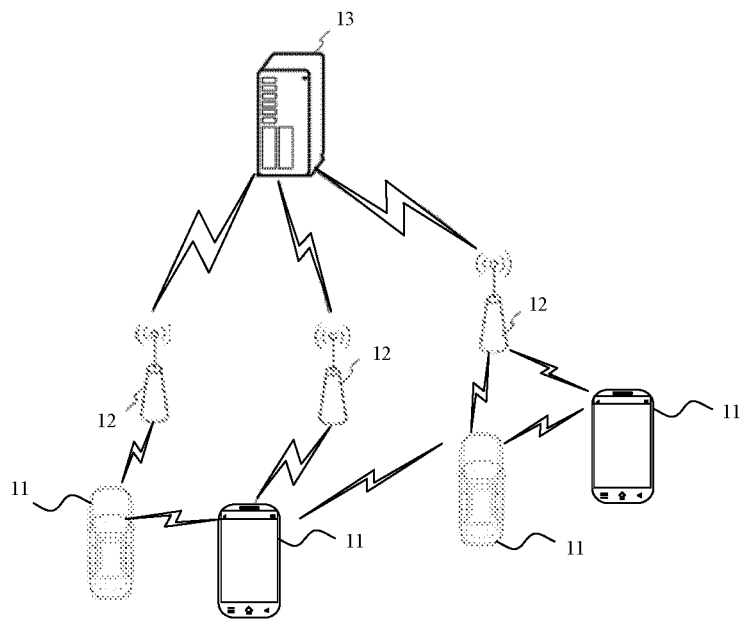
FIG. 1 is a schematic diagram of a wireless communication system according to an embodiment.

FIG. 1 is a schematic diagram of a wireless communication system according to an exemplary embodiment. As shown in FIG. 1, the wireless communication system is a communication system based on cellular mobile communication technology. The wireless communication system may include: a plurality of terminals 11 and a plurality of base stations 12.

The terminal 11 may be a device that provides voice and/or data connectivity to a user. The terminal 11 may communicate with one or more core networks via a Radio Access Network (RAN). The terminal 11 may be an Internet of Things (IoT) terminal, such as a sensor device, a mobile phone (or "cellular" phone), and a computer with an IoT terminal. For example, the terminal 11 may be a stationary, portable, pocket-sized, handheld, computer-built, or vehicle-mounted device, such as, a station (STA), a subscriber unit, a subscriber station, a mobile station, a mobile, a remote station, an access point, a remote terminal, an access terminal, a user terminal, a user agent, a user device, or a User Equipment (UE). Alternatively, the terminal 11 may be an unmanned aerial vehicle device. Alternatively, the terminal 11 may be an in-vehicle device, for example, an Electronic Control Unit (ECU) having wireless communication function, or a wireless communication device connected to an external ECU. Alternatively, the terminal 11 can also be a roadside device, for example, a street light, a signal light, or other roadside devices having wireless communication function, etc.

The base station 12 may be a network side device in a wireless communication system. The wireless communication system may be the 4th generation (4G) mobile communication system, also known as Long Term Evolution (LTE) system. Alternatively, the wireless communication system may also be a 5G system, also known as New Radio (NR) system or 5G NR system. Alternatively, the wireless communication system may be any next-generation system of the 5G system. The access network in the system may be called New Generation-RAN (NG-RAN).

The base station 12 can be an evolved base station (eNB) employed in the 4G system. Alternatively, the base station 12 may be a base station (gNB) with a centralized distributed architecture employed in the 5G system. When the base station 12 adopts a centralized distributed architecture, it usually includes a Central Unit (CU) and at least two Distributed Units (DUs). The CU is equipped with protocol stacks of the Packet Data Convergence Protocol (PDCP) layer, the Radio Link Control (RLC) layer, and the Media Access Control (MAC) layer. The DU is equipped with the protocol stack of the physical (PHY) layer, and the specific implementation of the base station 12 is not limited in this disclosure.

A wireless connection can be established between the base station 12 and the terminal 11 via a radio interface. In different implementations, the radio interface is a radio interface based on the 4G standard. Alternatively, the radio interface is a radio interface based on the 5G standard, such as a NR. Alternatively, the radio interface may also be a radio interface based on the standard of the next generation of 5G.

In some embodiments, End to End (E2E) connections can also be established between the terminals 11 in scenarios, such as, Vehicle to Vehicle (V2V) communication, Vehicle to Infrastructure (V2I) communication, and Vehicle to Pedestrian (V2P) communication in Vehicle to Everything (V2X) communication, etc.

In some embodiments, the above wireless communication system may also include a network management device 13.

A plurality of base stations 12 are connected to the network management device 13 respectively. The network management device 13 may be a core network device in the wireless communication system, for example, a Mobility Management Entity (MME) in an Evolved Packet Core (EPC) network. Alternatively, the network management device may be another core network device, such as a Serving GateWay (SGW), Public Data Network GateWay (PGW), Policy and Charging Rules Function (PCRF), or Home Subscriber Server (HSS), etc. The implementation form of the network management device 13 is not limited in the embodiments of the disclosure.

In some embodiments, to save the power consumption of UE, the network can configure discontinuous reception (DRX) for the UE. When the UE is in a connected state, DRX configuration includes an inactivity timer, an on duration timer, a cycle and a start offset, an uplink Hybrid Automatic Repeat request Round-TripTime (HARQ RTT) timer, a downlink HARQ RTT timer, an uplink retransmission timer, a downlink retransmission timer, etc. The cycle and the start offset can be used to determine a periodic start time point of a wakeup timer. Whenever the UE receives Downlink Control Information (DCI) carrying its own Cell-Radio Network Temporary Identifier (C-RNTI) on a Physical Downlink Control Channel (PDCCH), the inactivity timer is activated. The UE listens to the PDCCH only during the wakeup period, and the UE can save power consumption by stop listening to the PDCCH at other time periods. When the UE receives a MAC Protocol Data Unit (PDU), it starts the downlink HARQ RTT timer of the corresponding HARQ process after sending a feedback to the base station, and when the downlink HARQ RTT timer is expired, it starts the downlink retransmission timer. After the UE sends a physical uplink shared channel (PUSCH) transmission, the UE starts the uplink HARQ RTT timer of the corresponding HARQ process, and when the uplink HARQ RTT timer is expired, it starts the uplink retransmission timer. The wakeup period includes operation of the wakeup timer, the inactivity timer, the uplink retransmission timer, and the downlink retransmission timer.

In order to reduce the number of connection failures occurring during movement of the user, such as, cell handover failure or connection failure before cell handover is triggered, conditional handover (CHO) is introduced. In the traditional handover process, the network configures only one target cell for cell handover, while in CHO, unlike the traditional handover approach, the network pre-configures multiple candidate target cells. When the connection condition is good, the network can send a handover command to the terminal UE earlier than the traditional handover, instead of sending the handover command when the network connection condition starts to deteriorate as in the traditional handover. When the command is received, the terminal UE stores the command instead of executing it immediately, and when a configured candidate target cell satisfies a configured condition, the terminal UE starts executing the stored command, and then executes the handover command and connects to the target cell as in traditional handover.

In some embodiments, the following two types of measurement reporting events are used for CHO:

handover condition A3: the reassigned candidate cell in the CHO has better signal conditions than the Primary Cell (Pcell) or the Primary Secondary Cell (PSCell);

handover condition A5: signal quality of Pcell or PSCell is worse than an absolute threshold value 1 and the signal quality of the reassigned candidate cell in the CHO is better than an absolute threshold value 2.

In NTN system, the traditional cell handover method may not be very applicable due to the problems such as huge transmission latency and small variation of measured signal quality, etc., while the CHO handover method can well avoid the problems such as failure of receiving a handover command or receiving the handover command not in time, etc.

Figure 2:
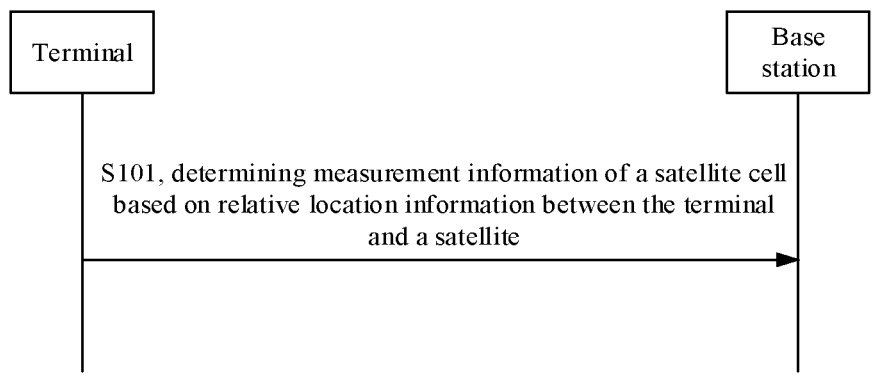
FIG. 2 is a flowchart I of a cell handover or reselection method according to an embodiment.

As shown in FIG. 2, the embodiment of the disclosure provides a cell handover or reselection method, applicable to a terminal. The method includes the following steps.

At step S101, measurement information of a satellite cell is determined based on relative location information between the terminal and a satellite.

The embodiments of the disclosure provide a cell handover or reselection method, a cell handover or reselection apparatus, a communication device and a storage medium. Through the technical solution of the embodiments of the disclosure, the terminal can transmit the measurement information of the satellite cell to the base station based on the relative location relation between the terminal and the satellite, thereby facilitating the base station and the terminal to perform operations such as CHO, etc., based on the measurement information corresponding to the relative location relation and the like. Compared with the way that the terminal only detects the signal quality, the reliability and practicality of the measurement information are improved.

In an embodiment of the disclosure, the relative location information between the terminal and the satellite may be determined by means of satellite cell measurement.

In some embodiments, the terminal may transmit the determined relative location information between the terminal and the satellite to the base station.

The terminal performs detection by positioning systems, such as Global Navigation Satellite System (GNSS) or Global Positioning System (GPS), etc. Through positioning, the terminal can know its current geographical location or the relative location information between the terminal and a satellite in whose coverage range the terminal is located.

The terminal knows its current geographical location, based on a satellite position broadcasted by the satellite, ephemeris information, or PVT (a satellite position, a velocity, and time information) broadcasted by the satellite, etc. The above-mentioned relative location information between the terminal and the satellite can be obtained by performing calculation on the information related to its own geographical location and the location of the satellite.

In an embodiment of the disclosure, the relative location information between the terminal and the satellite may include: a relative distance, a relative distance between the terminal and a cell central location of a satellite cell covered by the satellite, and a minimum elevation angle value of the terminal that can receive the satellite signal within a satellite coverage range and the like.

The above measurement information may include one or more kinds of the relative location information, and may also be data obtained by performing calculation or processing based on the relative location information. For example, according to the relative location information between the terminal and the satellite, signal strength and signal quality of the satellite cell, a distance between a coverage range of the cell and the terminal, and other location relations are measured.

The measurement information of the satellite cell transmitted by the terminal can be used to determine whether a cell handover condition is satisfied and then to perform CHO. Alternatively, the measurement information of the satellite cell transmitted by the terminal can be used to determine there is no need to perform CHO and the like when the communication status of the terminal and the cell in which the terminal is currently located is good.

Compared with CHO, which only supports handover based on the reference signal quality, the embodiment of the disclosure takes into account the relative location relation between the terminal and the satellite, and the measurement information of the satellite cell is transmitted based on the relative location information, which provides CHO with more choices of handover conditions, thereby enhancing the CHO handover mode and improving the handover performance in the NTN system.

In some embodiments, the satellite cell includes: a serving cell where the terminal is located and/or at least one candidate target cell, and the relative location information between the terminal and the satellite includes at least one of the followings:

a first distance of a location of the terminal relative to a reference location of the serving cell;

a second distance of the location of the terminal relative to a reference location of the at least one candidate target cell;

a first minimum elevation angle value of the terminal capable of receiving a satellite signal corresponding to the serving cell; and a second minimum elevation angle value of the terminal capable of receiving a satellite signal corresponding to the at least one candidate target cell.

In an embodiment of the disclosure, the terminal may determine the measurement information of the satellite cell based on the relative location information between itself and the satellite. The satellite cell may include one cell or multiple cells within a coverage range of a single satellite, or one cell or multiple cells within the coverage ranges of multiple satellites respectively.

The one or more cells may include a serving cell where the terminal is located, which has a communication connection with the terminal, to provide communication services for the terminal. If the terminal is in the serving cell, and the communication quality is poor or the communication quality of an adjacent cell is better, it can perform cell switching to the adjacent cell by means of cell reselection, redirection or cell handover, etc.

The candidate target cell may include one or more adjacent cells of the serving cell in which the terminal is located, so that the terminal may perform cell switching to the candidate target cell when performing the above-mentioned cell reselection, redirection or cell handover.

In an embodiment of the disclosure, the candidate target cell may be a cell pre-selected or pre-determined by the base station based on the serving cell where the terminal is currently located, and the candidate target cell is sent to the terminal by a configuration method. In this way, the terminal can perform handover to the candidate target cell when the cell handover condition is satisfied.

In an embodiment of the disclosure, the relative location information between the terminal and the satellite may include a relative location relation between the terminal and the satellite, or a relative location relation between the terminal and the above serving cell or the candidate target cell covered by the satellite, including distance, angle and direction, etc.

For example, the relative location information between the terminal and the satellite may include the first distance of the location of the terminal relative to the reference location of the serving cell. The location of the terminal may be a geographical location of the terminal obtained by positioning. The serving cell is a cell where the terminal is located and that provides communication services to the terminal. The reference location of the serving cell may be a location of a service base station of the serving cell, a geometric center of a geographical area covered by the serving cell, or a reference location specified by the serving cell.

The above-mentioned relative location information may further include a second distance of the location of the terminal relative to a reference location of the at least one candidate target cell. The at least one candidate target cell may be optional cells pre-configured by the base station for the terminal to perform handover to, and may include one or more adjacent cells of the serving cell. Similar to the serving cell, the reference location of the candidate target cell is a location of a base station of the candidate target cell, a geometric center or a reference location specified by the candidate target cell itself. The second distance is a distance between the geographic location of the terminal and the reference location of the candidate target cell as described above.

It can be understood that the shorter the first distance mentioned above, the higher the possibility that the terminal has good communication quality in the serving cell, and the shorter the second distance, the higher the possibility that the terminal has good communication quality after the handover to the candidate target cell. Therefore, if the first distance is greater than or equal to a preset first threshold, and the second distance is less than or equal to a preset second threshold, the terminal can perform handover to the candidate target cell for better communication quality. Instead, if the first distance is less than or equal to the preset first threshold and the second distance is greater than or equal to the preset second threshold, the communication quality obtained by the terminal after the handover to the candidate target cell may become poor, thus the handover is unnecessary. In addition, if the first distance is greater than or equal to the first threshold, and the second distance is greater than or equal to the second threshold, the terminal may have difficulty in obtaining good communication quality in both cells. Alternatively, if the first distance is less than or equal to the first threshold and the second distance is less than or equal to the second threshold, the terminal may be able to obtain good communication quality in both cells. In such case, whether to perform the handover, remaining location unchanged, or not performing the handover can be determined by the UE itself or can be determined according to other conditions or according to relevant communication protocols.

In addition, the above-mentioned relative location information may also include: a first minimum elevation angle value of the terminal capable of receiving a satellite signal corresponding to the serving cell. Since the satellite rotates around the earth, the coverage range of the satellite is influenced by the shape of the earth. An angle between the horizon line and a line connecting a certain location on the ground and the satellite is an elevation angle from the certain location to the satellite. The first minimum elevation angle value is a minimum elevation angle value of a range in which the terminal can receive the satellite signal corresponding to the serving cell. When the elevation angle value of the terminal to the satellite is less than the first minimum elevation angle value, the terminal will not be able to receive the satellite signal. Therefore, an elevation angle of the terminal's position may be greater than the first minimum elevation angle value, otherwise handover may be necessary.

The above relative location information may also include the above-mentioned second minimum elevation angle value. If the elevation angle of the terminal's position is greater than the second minimum elevation angle value, the terminal can receive the satellite signal corresponding to the candidate target cell, so the terminal can perform handover to the candidate target cell if the communication quality of the terminal in the service cell is poor in such case if the communication quality of the terminal in the serving cell is poor in such case. Instead, if the elevation angle of the terminal's position is less than the second minimum elevation angle value, the terminal may not perform handover to the candidate target cell.

The embodiments of the disclosure provide a cell handover or reselection method, applicable to a terminal. The method includes:

in response to the first distance of the location of the terminal relative to the reference location of the serving cell being greater than or equal to a first distance threshold, determining the measurement information of the satellite cell;

and/or, in response to the first minimum elevation angle value of the terminal capable of receiving a satellite signal corresponding to the serving cell being less than or equal to a first minimum elevation angle threshold, determining the measurement information of the satellite cell.

In some embodiments, the terminal may transmit the determined relative location information between the terminal and the satellite to the base station.

The serving cell is a cell that provides communication services for the terminal. The location of the terminal may be a geographical location of the terminal or a location of the terminal relative to a preset reference object, for example, a location of the terminal relative to the base station in the serving cell. If the above-mentioned first distance is greater than or equal to the first distance threshold, the terminal may already be at the edge of the serving cell or at a location with poor signal quality, so the terminal may determine the measurement information of the satellite cell in such case, to further determine whether cell handover can be performed. Certainly, if whether to perform handover is determined by the network side, the measurement information of the satellite cell can be transmitted to the network side (e.g., the base station).

The first minimum elevation angle value of the terminal is a minimum elevation angle value of a location of the terminal relative to the satellite measured by the terminal. If the first minimum elevation angle value is less than or equal to the first minimum elevation angle threshold, the terminal may have difficulty in obtaining the communication quality that satisfies the demand in the serving cell. Therefore, in such case, the terminal may determine the measurement information of the satellite cell.

Figure 3:
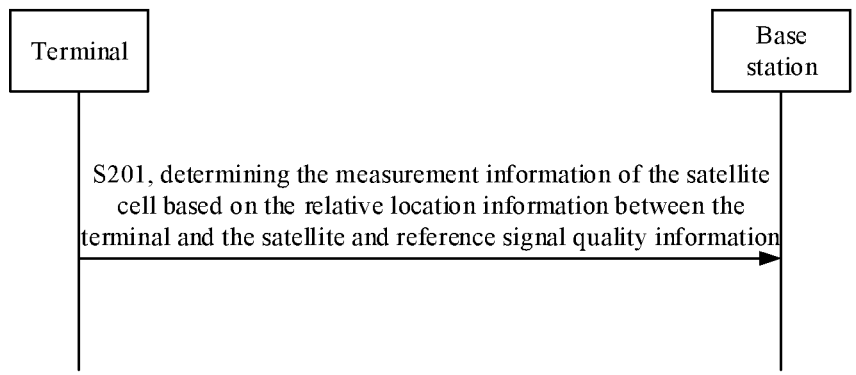
FIG. 3 is a flowchart II of a cell handover or reselection method, performed by a terminal, according to an embodiment.

As shown in FIG. 3, the embodiment of the disclosure provides a cell handover or reselection method, applicable to a terminal. The method includes the following steps.

At step S201, the measurement information of the satellite cell is determined based on the relative location information between the terminal and the satellite and reference signal quality information, in which the reference signal quality information includes: reference signal quality information of the at least one candidate target cell and/or reference signal quality information of the serving cell.

In some embodiments, the terminal may transmit the determined relative location information between the terminal and the satellite to the base station.

The relative location information between the terminal and the satellite may include: a relative distance, a relative distance between the terminal and a cell central location of the satellite cell covered by the satellite, and a minimum elevation value of the terminal capable of receiving the satellite signal within the satellite coverage range, etc. The relative location information between the terminal and the satellite represents the location where the terminal is located and its ability to receive the satellite cell signal in the range covered by the satellite.

The reference signal quality information is the quality of receiving and sending signals in the service area where the terminal is located. Reference signals include an uplink reference signal and a downlink reference signal, which are used for uplink/downlink channel estimation and channel quality measurement, etc. The reference signal quality information may include Reference Signal Received Power (RSRP), Reference Signal Received Quality (RSRQ), and Reference Signal based Signal to Noise and Interference Ratio (RS-SINR), etc. Based on the reference signal quality information, the terminal can know its own signal quality in the serving cell. If the signal quality of the current serving cell is determined to be poor based on the reference signal quality information, the terminal can perform handover.

In an embodiment of the disclosure, the terminal may transmit the measurement information of the cell based on the above-mentioned relative location information and/or the reference signal quality information.

In some embodiments, the terminal may transmit a cell handover request when the relative location information satisfies the handover conditions and/or the reference signal quality information satisfies the handover conditions, and then the terminal performs handover to a candidate target cell that satisfies the demand.

In this way, the terminal measures its own communication status with the satellite or communication status in the serving cell, the candidate target cell and the like from various aspects, and then performs CHO, which enhances the performance of CHO compared to the way in which only the reference signal quality is considered as the handover condition.

The embodiment of the disclosure provides a cell handover or reselection method, applicable to a terminal. The method includes:

in response to the first distance of the location of the terminal relative to the reference location of the serving cell being greater than or equal to a second distance threshold and the reference signal quality information of the at least one candidate target cell being greater than or equal to a preset first quality threshold, determining the measurement information of the satellite cell;

and/or, in response to the first minimum elevation angle value of the terminal capable of receiving a satellite signal corresponding to the serving cell being less than or equal to a first minimum elevation angle threshold and the reference signal quality information of the at least one candidate target cell being greater than or equal to the preset first quality threshold, determining the measurement information of the satellite cell.

The serving cell is a cell providing communication services to the terminal. The location of the terminal may be a geographical location of the terminal or a location of the terminal relative to a preset reference object, e.g., a location of the terminal relative to the base station of the serving cell. If the above-mentioned first distance is greater than or equal to the second distance threshold, the terminal may already be at the edge of the serving cell or at a location with poor signal quality. In such case, if the reference signal quality information of the candidate target cell is greater than or equal to the preset first quality threshold, the terminal may be able to obtain communication services that satisfy the demand in the candidate target cell. Therefore, in such case, the terminal may transmit the measurement information of the satellite cell, to further determine whether it can perform handover.

In addition, the first minimum elevation angle value of the terminal is a minimum elevation angle value of the location of the terminal relative to the satellite measured by the terminal. If the first minimum elevation angle value is less than or equal to the first minimum elevation angle threshold, the terminal may have difficulty in obtaining the communication quality that satisfies the demand in the serving cell. In such case, if the reference signal quality information of the candidate target cell is greater than or equal to the preset first quality threshold, the terminal may be able to obtain the communication service that satisfies the demand in the candidate target cell. Therefore, in such case, optionally, the terminal may transmit the measurement information of the satellite cell, to enable the network side device (e.g., the base station) to further determine whether handover can be performed.

In an embodiment, the terminal may also transmit a cell handover request based on the above-mentioned relative location information and/or the reference signal quality information. That is, cell CHO may be requested when the relative location information and/or the reference signal quality information satisfies the preset handover conditions.

With the technical solution of the embodiment of the disclosure, the terminal transmit the measurement information of the satellite cell using the distance to the reference location of the serving cell and the minimum elevation angle value in combination with the reference signal quality information, to further perform CHO. The performance of handover is improved compared to the way that only the reference signal quality information is considered.

The embodiment of the disclosure provides a cell handover or reselection method, applicable to a terminal. The method includes:

in response to the second distance of a location of the terminal relative to a reference location of the at least one candidate target cell being less than or equal to a third distance threshold, and the reference signal quality information of the serving cell being less than a preset second quality threshold, determining the measurement information of the satellite cell;

and/or, in response to the second minimum elevation angle value of the terminal capable of receiving a satellite signal corresponding to the at least one candidate target cell being greater than or equal to a second minimum elevation angle threshold, and the reference signal quality information of the serving cell being less than the preset second quality threshold, determining the measurement information of the satellite cell.

In some embodiments, the terminal may transmit the determined relative location information between the terminal and the satellite to the base station.

The serving cell is a cell providing communication services to the terminal. The location of the terminal may be a geographical location of the terminal or a location of the terminal relative to a preset reference object, e.g., the location of the terminal relative to the base station of the serving cell. If the above-mentioned second distance is less than or equal to the third distance threshold, it is possible that the terminal is already at a location within a range covered by the candidate target cell. In such case, if the reference signal quality information of the serving cell is greater than or equal to the preset second quality threshold, the terminal may have difficulty in obtaining communication services that satisfy the demand in the serving cell. Therefore, in such case, optionally, the terminal may transmit the measurement information of the satellite cell, to enable the network side device (e.g., base station) to further determine whether handover can be performed.

In addition, the second minimum elevation angle value of the terminal is a minimum elevation angle value of the location of the terminal relative to the satellite corresponding to the candidate target cell measured by the terminal. If the second minimum elevation angle value is less than or equal to the second minimum elevation angle threshold, the terminal may be able to obtain, at a location where it locates, the communication services that satisfy the demand provided by the candidate target cell. In such case, if the reference signal quality information of the serving cell is less than or equal to the preset second quality threshold, the terminal may have difficulty in obtaining communication services that satisfy the demand in the serving cell. Therefore, the terminal can optionally transmit the measurement information of the satellite cell in such case, to enable the network side device (e.g., base station) to further determine whether handover can be performed.

In an embodiment, the terminal may also transmit a cell handover request based on the above-mentioned relative location information and the reference signal quality information. That is, when the relative location information and/or the reference signal quality information satisfies preset handover conditions, CHO can be requested for the cell.

With the technical solution of the embodiment of the disclosure, the terminal transmits the measurement information of the satellite cell using the distance to the reference location of the serving cell and the minimum elevation angle value in combination with the reference signal quality information, to further perform CHO. The performance of handover is improved compared to the way that only the reference signal quality information is considered.

Figure 4:
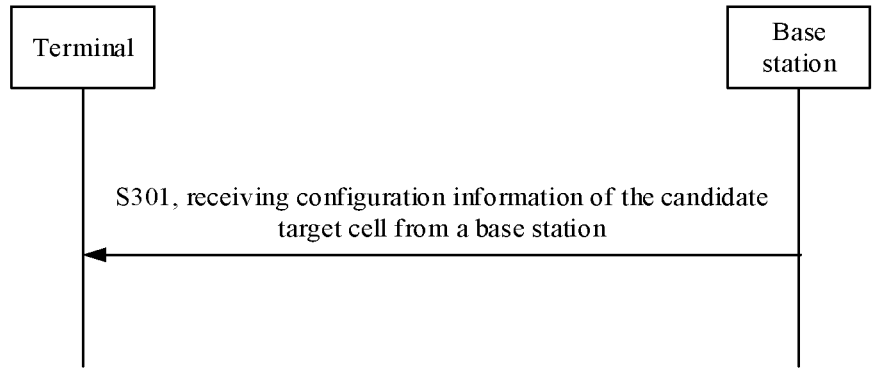
FIG. 4 is a flowchart III of a cell handover or reselection method according to an embodiment.

As shown in FIG. 4, the embodiment of the disclosure provides a cell handover or reselection method, applicable to a terminal. The method includes the following steps.

At step S301, configuration information of the candidate target cell is received from a base station, in which the configuration information of the candidate target cell is configured to configure the candidate target cell of the terminal for CHO.

In an embodiment of the disclosure, the terminal receives the configuration information of the candidate target cell sent by the base station. The configuration information may be used to configure one or more candidate target cells. The candidate target cell may be an adjacent cell of the serving cell in which the terminal is located.

After acquiring the configuration information, the terminal can determine whether a handover condition for the CHO is satisfied at any time during the communication process based on parameters such as its own location, a relative location relation with the satellite and/or the reference signal quality information, etc. If the handover condition is satisfied, it can perform handover to the candidate target cell that satisfies the condition based on the configuration information.

With the technical solution of the embodiment of the disclosure, it is possible to obtain the configuration information of the candidate target cell in advance when the terminal is within the range of the serving cell, so as to quickly to perform handover to the candidate target cell when the CHO conditions are satisfied.

In some embodiments, the measurement information of the satellite cell includes: a handover request for requesting handover to the candidate target cell.

In an embodiment of the disclosure, the terminal transmits the measurement information of the satellite cell to the base station, and if the CHO conditions are satisfied in such case, e.g., the relative location information between the terminal and the satellite satisfies a preset handover condition, and/or the reference signal quality information satisfies a preset handover condition, the terminal can carry the handover request in the signaling of the measurement information and transmit it to the base station.

Certainly, the terminal may also transmit the measurement information and the above-mentioned handover request via different signaling, respectively.

Figure 5:
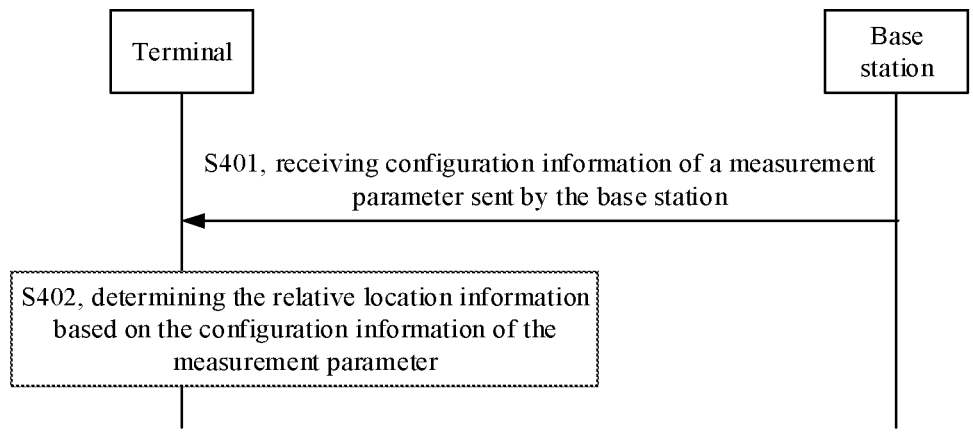
FIG. 5 is a flowchart IV of a cell handover or reselection method according to an embodiment.

As shown in FIG. 5, the embodiment of the disclosure provides a cell handover or reselection method, applicable to a terminal. The method includes the following steps.

At step S401, configuration information of a measurement parameter sent by the base station is received.

At step S402, the relative location information between the terminal and the satellite is determined based on the configuration information of the measurement parameter.

The terminal can determine the handover condition for CHO, or determine measurement contents of the transmitted measurement information, or the like, based on the configuration configured by the base station. Therefore, the terminal may receive the configuration information of the measurement parameter sent by the base station. The configuration information of the measurement parameter may include a type of a parameter to be measured by the terminal, and a threshold range corresponding to each type of parameter. The terminal may further determine whether to request a CHO based on whether each parameter satisfies the threshold range.

In an embodiment of the disclosure, the terminal can determine a relative location relation between the terminal and the satellite based on the configuration information of the above measurement parameter. The relative location relation represents a possible relation between the location of the terminal and the satellite cell in terms of communication quality, so the terminal can further determine whether to perform the CHO based on the relative location relation.

Compared with the way that the terminal only considers the reference signal quality information as the CHO condition, it is possible to combine various parameters such as the location of the terminal and the like, to improve the reliability of handover.

Figure 6:
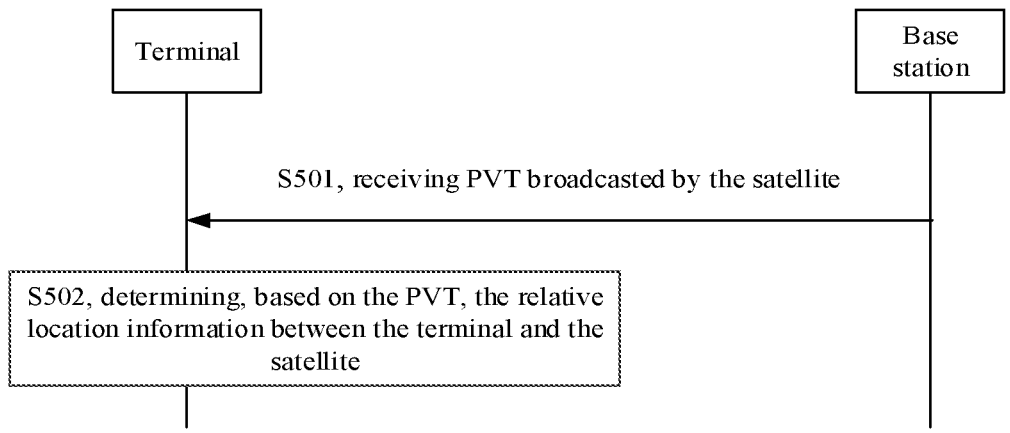
FIG. 6 is a flowchart V of a cell handover or reselection method according to an embodiment.

In some embodiments, as shown in FIG. 6, the method further includes the following steps.

At step S501, PVT broadcasted by the satellite is received.

At step S502, based on the PVT, the relative location information between the terminal and the satellite is determined.

The PVT contains position information, velocity information, and time information of the satellite. Since the satellite rotates around the earth, a coverage range of the satellite changes over time. Therefore, the terminal can determine a location relation between itself and the satellite based on the PVT broadcasted by the satellite, which facilitates determining the condition for CHO.

Figure 7:
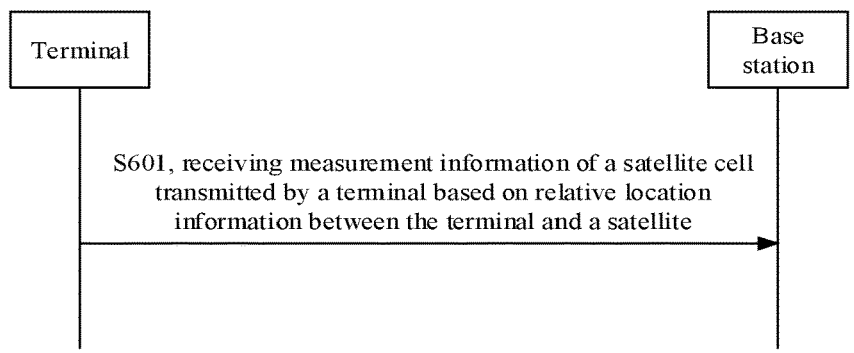
FIG. 7 is a flowchart VI of a cell handover or reselection method, performed by a base station, according to an embodiment.

As shown in FIG. 7, the embodiment of the disclosure provides a cell handover or reselection method, applicable to a base station. The method includes the following steps.

At step S601, measurement information of a satellite cell transmitted by a terminal based on relative location information between the terminal and a satellite is received.

In an embodiment of the disclosure, the relative location information between the terminal and the satellite may include: a relative distance, a relative distance between the terminal and a cell central location of the satellite cell covered by the satellite, and a minimum elevation value of the terminal capable of receiving a satellite signal within a satellite coverage range, etc.

The above measurement information may include one or more kinds of the relative location information, and may also be data obtained by performing calculation or processing based on the relative location information. For example, according to the relative location information between the terminal and the satellite, location relations such as signal strength and signal quality of the satellite cell, a distance between a coverage range of the cell and the terminal, and the like are measured.

The base station can determine whether the terminal satisfies the cell handover conditions according to the measurement information of the satellite cell transmitted by the terminal, and perform CHO. Alternatively, the base station can determine a communication status of the cell in which the terminal is currently located and the terminal is good according to the measurement information of the satellite cell transmitted by the terminal, so there is no need to perform CHO and the like.

Compared with CHO, which only supports handover based on the reference signal quality, the embodiment of the disclosure takes into account the relative location relation between the terminal and the satellite, the base station receives the measurement information of the satellite cell transmitted by the terminal based on the relative location information, thus having more choices of CHO handover conditions, thereby enhancing the CHO handover mode and improving the handover performance in the NTN system.

In some embodiments, the satellite cell includes: a serving cell where the terminal is located and/or at least one candidate target cell, and the relative location information between the terminal and the satellite includes at least one of the followings:
 a first distance of a location of the terminal relative to a reference location of the serving cell;
 a second distance of the location of the terminal relative to a reference location of the at least one candidate target cell;
 a first minimum elevation angle value of the terminal capable of receiving a satellite signal corresponding to the serving cell; and
 a second minimum elevation angle value of the terminal capable of receiving a satellite signal corresponding to the at least one candidate target cell.

In an embodiment of the disclosure, the satellite cell may include one cell or multiple cells within a coverage range of a single satellite, or one cell or multiple cells within the coverage ranges of multiple satellites respectively.

The one or more cells may include a serving cell where the terminal is located, which has a communication connection with the terminal, to provide communication services for the terminal. If the terminal is in the serving cell, and the communication quality is poor or the communication quality of an adjacent cell is better, it can perform cell switching to the adjacent cell by means of cell reselection, redirection or cell handover, etc.

The candidate target cell may include one or more adjacent cells of the serving cell in which the terminal is located, so that the terminal may perform cell switching to the candidate target cell when performing the above-mentioned cell reselection, redirection or cell handover.

In an embodiment of the disclosure, the candidate target cell may be a cell pre-selected or pre-determined by the base station based on the serving cell where the terminal is currently located, and the candidate target cell is sent to the terminal by a configuration method. In this way, the terminal can perform handover to the candidate target cell when a cell handover condition is satisfied.

In an embodiment of the disclosure, the relative location information between the terminal and the satellite may include a relative location relation between the terminal and the satellite, or a relative location relation between the terminal and the above serving cell or the candidate target cell covered by the satellite, including a distance, an angle and a direction, etc.

For example, the relative location information between the terminal and the satellite may include the first distance of a location of the terminal relative to a reference location of the serving cell. The location of the terminal may be a geographical location of the terminal obtained by positioning. The serving cell is a cell where the terminal is located and that provides communication services to the terminal. The reference location of the serving cell may be a location of a service base station of the serving cell, a geometric center of a geographical area covered by the serving cell, or a reference location specified by the serving cell.

The above-mentioned relative location information may further include a second distance of the location of the terminal relative to a reference location of the at least one candidate target cell. The at least one candidate target cell may be optional cells pre-configured by the base station for the terminal to perform handover to, and may include one or more adjacent cells of the serving cell. Similar to the serving cell, the reference location of the candidate target cell is a location of the base station of the candidate target cell, a geometric center or a reference location specified by the candidate target cell itself. The second distance is a distance between the geographic location of the terminal and the reference location of the candidate target cell as described above.

It can be understood that the shorter the first distance mentioned above, the higher the possibility that the terminal has good communication quality in the serving cell, and the shorter the second distance, the higher the possibility that the terminal has good communication quality after the handover to the candidate target cell. Therefore, if the first distance is greater than a preset first threshold, and the second distance is less than a preset second threshold, the base station may instruct the terminal to perform handover to the candidate target cell based on the obtained measurement information for better communication quality. Instead, if the first distance is less than the preset first threshold and the second distance is greater than the preset second threshold, the communication quality obtained by the terminal after the handover to the candidate target cell may become poor, thus the handover is unnecessary. In addition, if the first distance is greater than the first threshold, and the second distance is greater than the second threshold, the terminal may have difficulty in obtaining good communication quality in both cells. Alternatively, if the first distance is less than the first threshold and the second distance is less than the second threshold, the terminal may be able to obtain good communication quality in both cells. In such case, the base station can determine whether to perform the handover or remain location unchanged according to other conditions, or handover is not performed by default.

In addition, the above-mentioned relative location information may also include: a first minimum elevation angle value of the terminal capable of receiving a satellite signal corresponding to the serving cell. Since the satellite rotates around the earth, the coverage range of the satellite is influenced by the shape of the earth. An angle between the horizon line and a line connecting a certain location on the ground and the satellite is an elevation angle from the certain location to the satellite. The first minimum elevation angle value is a minimum elevation angle value of a range in which the terminal can receive the satellite signal corresponding to the serving cell. When the elevation angle value of the terminal to the satellite is less than the first minimum elevation angle value, the terminal will not be able to receive the satellite signal. Therefore, an elevation angle of the terminal's position may be greater than the first minimum elevation angle value, otherwise handover is necessary.

The above relative location information may also include the above-mentioned second minimum elevation angle value. If the elevation angle of the terminal's position is greater than the second minimum elevation angle value, the terminal can receive the satellite signal corresponding to the candidate target cell, so the terminal can perform handover to the candidate target cell if the communication quality of the terminal in the service area is poor in such case. Instead, if the elevation angle of the terminal's position is less than the second minimum elevation angle value, the terminal may not perform handover to the candidate target cell.

The embodiment of the disclosure provides a cell handover or reselection method, applicable to a base station. The method includes:
receiving the measurement information of the satellite cell transmitted in response to the first distance being greater than or equal to a first distance threshold by the terminal;
and/or,
receiving the measurement information of the satellite cell transmitted in response to the first minimum elevation angle value being less than or equal to a first minimum elevation angle threshold by the terminal.

The serving cell is a cell that provides communication services for the terminal. The location of the terminal may be a geographical location of the terminal or a location of the terminal relative to a preset reference object, for example, a location of the terminal relative to the base station in the serving cell. If the above-mentioned first distance is greater than or equal to the first distance threshold, the terminal may already be at the edge of the serving cell or at a location with poor signal quality, so the base station receives the measurement information of the satellite cell transmitted by the terminal, which can facilitate further determination of whether handover can be performed.

The first minimum elevation angle value of the terminal is a minimum elevation angle value of a location of the terminal relative to the satellite measured by the terminal. If the first minimum elevation angle value is less than the first minimum elevation angle threshold, the terminal may have difficulty in obtaining the communication quality that satisfies the demand in the serving cell. Therefore, the base station receives the measurement information of the satellite cell transmitted by the terminal, which can facilitate further determination of whether handover can be performed.

Figure 8:
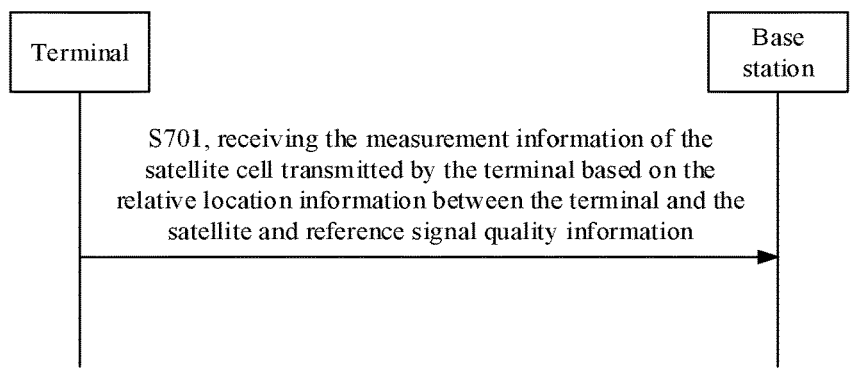
FIG. 8 is a flowchart VII of a cell handover or reselection method according to an embodiment.

As shown in FIG. 8, the embodiment of the disclosure provides a cell handover or reselection method, applicable to a base station. The method includes the following steps.

At step S701, the measurement information of the satellite cell transmitted by the terminal is received, in which the measurement information of the satellite cell is determined by the terminal based on the relative location information between the terminal and the satellite and/or reference signal quality information, and the reference signal quality information includes: reference signal quality information of the at least one candidate target cell and/or reference signal quality information of the serving cell.

The reference signal quality information is the quality of receiving and sending signals in the service area where the terminal is located. Reference signals include an uplink reference signal and a downlink reference signal, which are used for uplink/downlink channel estimation and channel quality measurement, etc. The reference signal quality information may include RSRP, RSRQ, and RS-SINR, etc. Based on the reference signal quality information, the terminal can know its own signal quality in the serving cell. If the signal quality of the current serving cell is determined to be poor based on the reference signal quality information, the base station can perform handover for the terminal.

In this way, the base station can perform CHO by measuring a communication status of the terminal with the satellite or in the serving cell and the candidate target cell and the like from multiple aspects through the terminal, which enhances the performance of CHO compared to the way of considering only the reference signal quality as the handover condition.

The embodiment of the disclosure provides a cell handover or reselection method, applicable to a base station. The method includes:
receiving the measurement information of the satellite cell transmitted, in response to the first distance being greater than or equal to a second distance threshold and the reference signal quality information of the at least one candidate target cell being greater than a preset first quality threshold, by the terminal;
and/or,
receiving the measurement information of the satellite cell transmitted, in response to the first minimum elevation angle value being less than or equal to a first minimum elevation angle threshold and the reference signal quality information of the at least one candidate target cell being greater than the preset first quality threshold, by the terminal.

The serving cell is a cell that provides communication services for the terminal. The location of the terminal may be a geographical location of the terminal or a location of the terminal relative to a preset reference object, for example, a location of the terminal relative to the base station in the serving cell. If the above-mentioned first distance is greater than or equal to the second distance threshold, the terminal may already be at the edge of the serving cell or at a location with poor signal quality. In such case, if the reference signal quality information of the candidate target cell is greater than or equal to the preset first quality threshold, the terminal may be able to obtain communication services that satisfy the demand in the candidate target cell. Therefore, the base station receives the measurement information of the satellite cell transmitted by the terminal, which can facilitate further determination of whether handover can be performed.

In addition, the first minimum elevation angle value of the terminal is a minimum elevation angle value of the location of the terminal relative to the satellite measured by the terminal. If the first minimum elevation angle value is less than or equal to the first minimum elevation angle threshold, the terminal may have difficulty in obtaining the communication quality that satisfies the demand in the serving cell. In such case, if the reference signal quality information of the candidate target cell is greater than or equal to the preset first quality threshold, the terminal may be able to obtain the communication service that satisfies the demand in the candidate target cell. Therefore, the base station receives the measurement information of the satellite cell transmitted by the terminal, which can facilitate further determination of whether handover can be performed.

With the technical solution of the embodiment of the disclosure, the base station can receive the measurement information of the satellite cell transmitted by the terminal using the distance to the reference location of the serving cell and the minimum elevation angle value in combination with the reference signal quality information, thus facilitating further CHO handover, thereby improving the performance of handover compared to the way of considering only the reference signal quality information.

The embodiment of the disclosure provides a cell handover or reselection method, applicable to a base station. The method includes:
receiving the measurement information of the satellite cell transmitted, in response to the second distance being less than or equal to a third distance threshold, and the reference signal quality information of the serving cell being less than a preset second quality threshold, by the terminal;
and/or,
receiving the measurement information of the satellite cell transmitted by the terminal, in response to the second minimum elevation angle value being greater than or equal to a second minimum elevation angle threshold, and the reference signal quality information of the serving cell being less than the preset second quality threshold.

The serving cell is a cell that provides communication services for the terminal. The location of the terminal may be a geographical location of the terminal or a location of the terminal relative to a preset reference object, for example, a location of the terminal relative to the base station in the serving cell. If the above-mentioned second distance is less than or equal to the third distance threshold, the terminal may already be at a location within a range that can be covered by the candidate target cell. In such case, if the reference signal quality information of the serving cell is greater than the preset second quality threshold, the terminal may have difficulty in obtaining communication services that satisfy the demand in the serving cell. Therefore, the base station receives the measurement information of the satellite cell transmitted by the terminal, which may facilitate further determination of whether handover can be performed.

In addition, the second minimum elevation angle value of the terminal is a minimum elevation angle value of the location of the terminal relative to the satellite corresponding to the candidate target cell measured by the terminal. If the second minimum elevation angle value is less than or equal to the second minimum elevation angle threshold, the terminal may be able to obtain, at a location where it locates, the communication services that satisfy the demand provided by the candidate target cell. In such case, if the reference signal quality information of the serving cell is less than or equal to the preset second quality threshold, the terminal may have difficulty in obtaining communication services to satisfy the demand in the serving cell. Therefore, the base station receives the measurement information of the satellite cell transmitted by the terminal, which may facilitate further determination of whether handover can be performed.

With the technical solution of the embodiment of the disclosure, the terminal transmits the measurement information of the satellite cell using the distance to the reference location of the serving cell and the minimum elevation angle value in combination with the reference signal quality information, to further perform CHO, which improves the performance of handover compared to the way that only the reference signal quality information is considered.

The embodiment of the disclosure provides a cell handover or reselection method, applicable to a base station. The method includes:
sending configuration information of the candidate target cell, in which the configuration information of the candidate target cell is configured to configure the candidate target cell of the terminal for CHO.

In an embodiment of the disclosure, the base station sends the configuration information of the candidate target cell to the terminal. The configuration information may be used to configure one or more candidate target cells. The candidate target cell may be an adjacent cell of the serving cell in which the terminal is located.

After the base station sends the configuration information, the terminal can determine whether a handover condition for the CHO is satisfied at any time during the communication process based on parameters such as its own location, a relative location relation with the satellite and/or the reference signal quality information, etc. If the handover condition is satisfied, the terminal can perform handover to the candidate target cell that satisfies the condition based on the configuration information.

With the technical solution of the embodiment of the disclosure, the base station can send the configuration information of the candidate target cell in advance when the terminal is within the range of the serving cell, so that the terminal can quickly perform handover to the candidate target cell when the CHO conditions are satisfied.

The embodiment of the disclosure provides a cell handover or reselection method, applicable to a base station. The method includes:
sending configuration information of a measurement parameter based on a coverage range of the satellite, in which the configuration information of the measurement parameter is used for the terminal to determine the relative location information.

The configuration information of the measurement parameter may include a types of a parameter to be measured by the terminal, and may also include a threshold range corresponding to each parameter type. The terminal may further determine whether to request CHO based on whether each parameter satisfies the threshold range.

The cell handover or reselection method and the cell handover or reselection system provided by the embodiments of the disclosure can effectively address that, in the NTN system, measurement information reporting is triggered and handover is performed by introducing a judgment method based on a location threshold or a received signal elevation angle threshold in combination with the measured quality of reference signals (RSRNTP/RSRQ/SINR).

For ease of description, the method is illustrated by steps, and the actual order does not follow exactly the described sequence.

Step 1, the base station configures candidate target cells for the UE via an IE ConditionalReconfiguration signaling.

Step 2: a location-based measurement reporting event or a reception elevation angle-based measurement reporting event is introduced in an IE ReportConfigNR signaling.

Step 3: the terminal UE that supports GNSS positioning obtains current location information by GNSS positioning, and a satellite sends its PVT by broadcasting. The terminal UE calculates a distance ΔD=P1−P2 between it and the reference location of a cell covered by the satellite, in which P1 is the current location information of the terminal UE, and P2 is the location information of the satellite broadcasted by the satellite and received by the terminal.

Step 4: the satellite notifies the UE of a minimum elevation angle (Ang) at which the satellite signal can be received by means of broadcasting.

Step 5: the network configures a distance threshold DThreshold and a reception elevation angle threshold AngThreshold according to a size of a cell radius of an area covered by it.

Step 6: the UE determines whether a measurement reporting event is to be fed back based on the received PVT information or based on a reception elevation angle value of the signal in combination with measured reference signal quality, and the UE sends a cell handover request in the following scenarios by the following modes.

Step 6a: handover from a cell covered by a satellite to a cell covered by another satellite, when a distance between the UE and a reference location of a serving cell ΔD≥DThreshold and/or the reception elevation angle value of the UE Ang AngThreshold, the UE sends a cell handover request indication via a reported IE MeasurementReport signaling.

Step 6b: handover from a cell covered by a satellite to a cell covered by a terrestrial base station, when the distance between the UE and the reference location of the serving cell ΔD≥DThreshold and/or the reception elevation angle value of the UE Ang≤AngThreshold, while the measured RSRP/RSRQ/SINR value of the target cell is greater than configured RSRP/RSRQ/SINR threshold, the UE feeds back a measurement result of RSRP/RSRQ/SINR of the target cell in the reported IE MeasurementReport and sends a cell handover request indication.

Step 6c: handover from a cell covered by a terrestrial base station to a cell covered by a satellite, when the measured RSRP/RSRQ/SINR value of the serving cell is less than the configured RSRP/RSRQ/SINR threshold, while a distance between the UE and a reference location of the target cell ΔD≤DThreshold and/or the reception elevation angle value of the UE Ang AngThreshold, the UE sends a cell handover request indication via the reported IE MeasurementReport.

According to the technical solution of the embodiments of the disclosure, in the NTN system, measurement information reporting is triggered and handover is performed by introducing a judgment method based on the location threshold or the reception signal elevation angle threshold in combination with the measured quality of reference signals (RSRNTP/RSRQ/SINR), which can improve the cell handover performance in the NTN system and reduce handover failure caused by inaccurately triggering of the measurement reporting mechanism.

Figure 9:
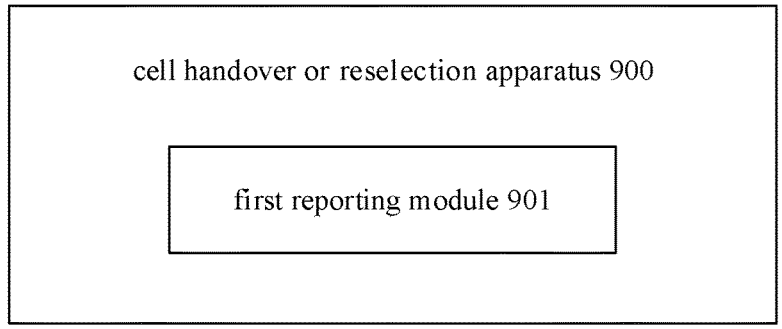
FIG. 9 is a block diagram I of a cell handover or reselection apparatus according to an embodiment.

As shown in FIG. 9, the embodiment of the disclosure also provides a cell handover or reselection apparatus 900, applicable to a terminal. The apparatus includes:

a first reporting module 901, configured to determine measurement information of a satellite cell based on relative location information between the terminal and a satellite.

In some embodiments, the terminal may transmit the determined relative location information between the terminal and the satellite to the base station via the first reporting module 901.

In some embodiments, the satellite cell includes: a serving cell where the terminal is located and/or at least one candidate target cell, and the relative location information between the terminal and the satellite includes at least one of the followings:

a first distance of a location of the terminal relative to a reference location of the serving cell;

a second distance of the location of the terminal relative to a reference location of the at least one candidate target cell;

a first minimum elevation angle value of the terminal capable of receiving a satellite signal corresponding to the serving cell; and a second minimum elevation angle value of the terminal capable of receiving a satellite signal corresponding to the at least one candidate target cell.

In some embodiments, the first reporting module includes:

a first reporting submodule, configured to, in response to the first distance being greater than or equal to a first distance threshold, determine the measurement information of the satellite cell;

and/or, a second reporting submodule, configured to, in response to the first minimum elevation angle value being less than or equal to a first minimum elevation angle threshold, determine the measurement information of the satellite cell.

Certainly, if it is determined by the network side on whether to perform handover or not, the measurement information of the satellite cell can be transmitted to the network side (e.g., a base station).

In some embodiments, the first reporting module includes:

a third reporting submodule, configured to transmit the measurement information of the satellite cell based on the relative location information between the terminal and the satellite and reference signal quality information, in which the reference signal quality information includes: reference signal quality information of the at least one candidate target cell and/or reference signal quality information of the serving cell.

In some embodiments, the third reporting submodule includes:

a fourth reporting submodule, configured to, in response to the first distance being greater than or equal to a second distance threshold and the reference signal quality information of the at least one candidate target cell being greater than or equal to a preset first quality threshold, determine the measurement information of the satellite cell;

and/or, a fifth reporting submodule, configured to, in response to the first minimum elevation angle value being less than or equal to a first minimum elevation angle threshold and the reference signal quality information of the at least one candidate target cell being greater than or equal to the preset first quality threshold, determine the measurement information of the satellite cell.

In some embodiments, the third reporting submodule includes:

a sixth reporting submodule, configured to, in response to the second distance being less than or equal to a third distance threshold, and the reference signal quality information of the serving cell being less than or equal to a preset second quality threshold, determine the measurement information of the satellite cell;

and/or, a seventh reporting submodule, configured to, in response to the second minimum elevation angle value being greater than or equal to a second minimum elevation angle threshold, and the reference signal quality information of the serving cell being less than or equal to the preset second quality threshold, determine the measurement information of the satellite cell.

In some embodiments, the apparatus further includes:

a first receiving module, configured to receive configuration information of the candidate target cell from a base station, in which the configuration information of the candidate target cell is configured to configure the candidate target cell of the terminal for CHO.

In some embodiments, the measurement information of the satellite cell includes: a handover request for requesting handover to the candidate target cell.

In some embodiments, the apparatus further includes:

a second receiving module, configured to receive configuration information of a measurement parameter sent by a base station; and a first determining module, configured to determine the relative location information based on the configuration information of the measurement parameter.

In some embodiments, the apparatus further includes:

a third receiving module, configured to receive PVT broadcasted by the satellite; and a second determining module, configured to determine, based on the PVT, the relative location information between the terminal and the satellite.

Figure 10:
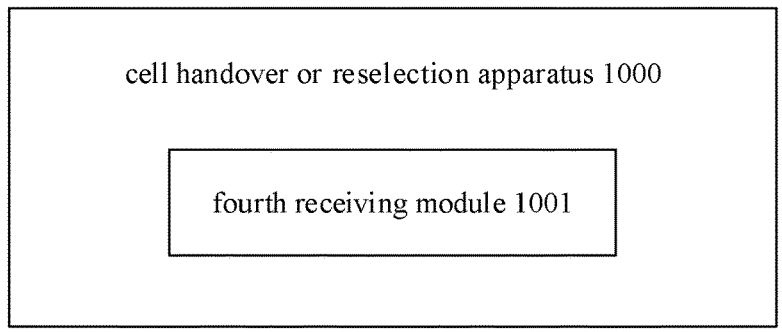
FIG. 10 is a block diagram II of a cell handover or reselection apparatus according to an embodiment.

As shown in FIG. 10, the embodiment of the disclosure also provides a cell handover or reselection apparatus 1000, applicable to a base station. The apparatus includes:

a fourth receiving module 1001, configured to receive measurement information of a satellite cell transmitted by a terminal based on relative location information between the terminal and a satellite.

In some embodiments, the satellite cell includes: a serving cell where the terminal is located and/or at least one candidate target cell, and the relative location information between the terminal and the satellite includes at least one of the followings:

a first distance of a location of the terminal relative to a reference location of the serving cell;

a second distance of the location of the terminal relative to a reference location of the at least one candidate target cell;

a first minimum elevation angle value of the terminal capable of receiving a satellite signal corresponding to the serving cell; and a second minimum elevation angle value of the terminal capable of receiving a satellite signal corresponding to the at least one candidate target cell.

In some embodiments, the fourth receiving module includes:

a first receiving submodule, configured to, receive the measurement information of the satellite cell transmitted, in response to the first distance being greater than or equal to a first distance threshold, by the terminal;

and/or, a second receiving submodule, configured to, receive the measurement information of the satellite cell transmitted, in response to the first minimum elevation angle value being less than or equal to a first minimum elevation angle threshold, by the terminal.

In some embodiments, the fourth receiving module includes:

a third receiving submodule, configured to receive the measurement information of the satellite cell transmitted by the terminal based on the relative location information between the terminal and the satellite and reference signal quality information, in which the reference signal quality information includes: reference signal quality information of the at least one candidate target cell and/or reference signal quality information of the serving cell.

In some embodiments, the third receiving submodule includes:

a fourth receiving submodule, configured to, receive the measurement information of the satellite cell transmitted, in response to the first distance being greater than or equal to a second distance threshold and the reference signal quality information of the at least one candidate target cell being greater than or equal to a preset first quality threshold, by the terminal;

and/or, a fifth receiving submodule, configured to, receive the measurement information of the satellite cell transmitted, in response to the first minimum elevation angle value being less than or equal to a first minimum elevation angle threshold and the reference signal quality information of the at least one candidate target cell being greater than or equal to the preset first quality threshold, by the terminal.

In some embodiments, the third receiving submodule includes:

a sixth receiving submodule, configured to, receive the measurement information of the satellite cell transmitted, in response to the second distance being less than or equal to a third distance threshold, and the reference signal quality information of the serving cell being less than or equal to a preset second quality threshold, by the terminal;

and/or, a seventh receiving submodule, configured to, receive the measurement information of the satellite cell transmitted, in response to the second minimum elevation angle value being greater than or equal to a second minimum elevation angle threshold, and the reference signal quality information of the serving cell being less than or equal to the preset second quality threshold, by the terminal.

In some embodiments, the apparatus further includes:
a first sending module, configured to send configuration information of the candidate target cell, in which the configuration information of the candidate target cell is configured to configure the candidate target cell of the terminal for CHO.

In some embodiments, the apparatus further includes:
a second sending module, configured to send configuration information of a measurement parameter based on a coverage range of the satellite, in which the configuration information of the measurement parameter is used for the terminal to determine the relative location information.

Regarding the apparatus in the above embodiments, the specific way in which each module performs its operation has been described in detail in the embodiments concerning the method, and will not be described in detail here.

Figure 11:
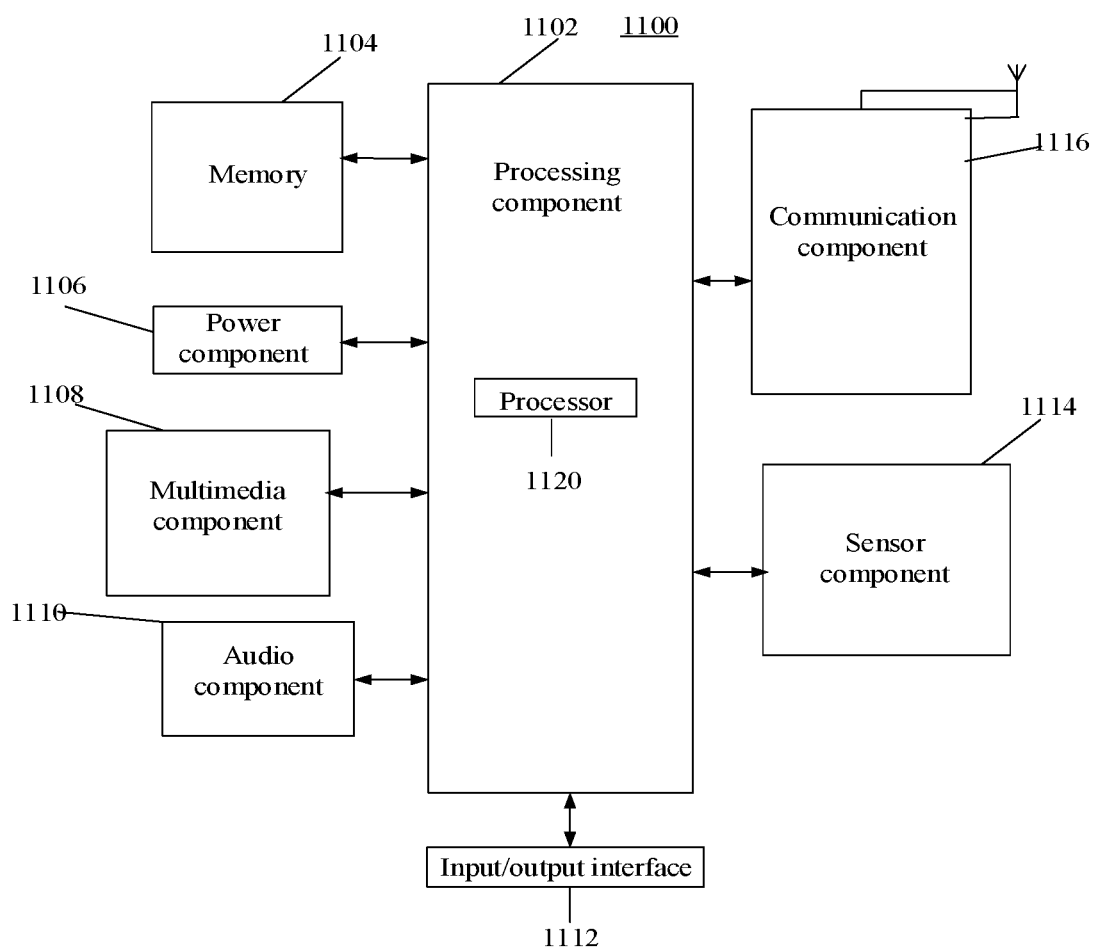
FIG. 11 is a block diagram I of a communication device according to an embodiment.

FIG. 11 is a block diagram of a communication device 1100 according to an exemplary embodiment. The communication device may be a terminal. For example, the communication device 1100 may be a mobile phone, a computer, a digital broadcasting UE, a message transceiver device, a game console, a tablet device, a medical device, a fitness device and a personal digital assistant, etc.

As illustrated in FIG. 11, the communication device 1100 may include at least one of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the communication device 1100, such as the operations associated with display, telephone calls, data communications, camera operations, and recording operations. The processing component 1102 may include at least one processor 1120 for executing instructions to perform all or part of the steps in the above described method. Moreover, the processing component 1102 may include at least one module which facilitate the interaction between the processing component 1102 and other components. For example, the processing component 1102 may include a multimedia module to facilitate the interaction between the multimedia component 1108 and the processing component 1102.

The memory 1104 is configured to store various types of data to support the operation of the communication device 1100. Examples of such data include instructions for any applications or methods operated on the communication device 1100, contact data, phonebook data, messages, pictures, video, etc. The memory 1104 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 1106 provides power to various components of the communication device 1100. The power component 1106 may include a power management system, at least one power source, and any other components associated with the generation, management, and distribution of power in the communication device 1100.

The multimedia component 1108 includes a screen providing an output interface between the communication device 1100 and the user. In some embodiments, the screen may include a Liquid Crystal Display (LCD) and a Touch Panel (TP). If the screen includes the touch panel, the screen may be implemented as a touch screen to receive input signals from the user. The touch panel includes at least one touch sensor to sense touches, swipes, and gestures on the touch panel. The touch sensor may not only sense a boundary of a touch or swipe action, but also sense a period of wakeup time and a pressure associated with the touch or swipe action. In some embodiments, the multimedia component 1108 includes a front-facing camera and/or a rear-facing camera. When the communication device 1100 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 1110 is configured to output and/or input audio signals. For example, the audio component 1110 includes a microphone (MIC) configured to receive an external audio signal when the communication device 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes at least one sensor to provide status assessments of various aspects of the communication device 1100. For instance, the sensor component 1114 may detect an open/closed status of the communication device 1100, relative positioning of components, e.g., the display and the keypad, of the communication device 1100, a change in position of the communication device 1100 or a component of the communication device 1100, a presence or absence of user contact with the communication device 1100, an orientation or an acceleration/deceleration of the communication device 1100, and a change in temperature of the communication device 1100. The sensor component 1114 may include a proximity sensor configured to detect the presence of nearby objects without any physical contact. The sensor component 1114 may also include a light sensor, such as a Complementary Metal Oxide Semiconductor (CMOS) or Charge-Coupled Device (CCD) image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the communication device 1100 and other devices. The communication device 1100 can access a wireless network based on a communication standard, such as Wi-Fi, 2G or 3G, or a combination thereof. In an exemplary embodiment, the communication component 1116 receives a broadcast signal or broadcast associated information from an external broadcast management system via a broadcast channel. In an exemplary embodiment, the communication component 1116 further includes a Near Field Communication (NFC)

module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In an exemplary embodiment, the communication device 1100 may be implemented with at least one Application Specific Integrated Circuit (ASIC), Digital Signal Processor (DSP), Digital Signal Processing Device (DSPD), Programmable Logic Device (PLD), Field Programmable Gate Array (FPGA), controller, micro-controller, microprocessor or other electronic components, for performing the above described method.

In an exemplary embodiment, there is also provided a non-transitory computer readable storage medium including executable instructions, such as the memory 1104, the executable instructions can be executed by the processor 1120 in the communication device 1100, for performing the above method. For example, the non-transitory computer-readable storage medium may be a ROM, a Random Access Memory (RAM), a CD-ROM, a magnetic tape, a floppy disc, and an optical data storage device, etc.

Figure 12:
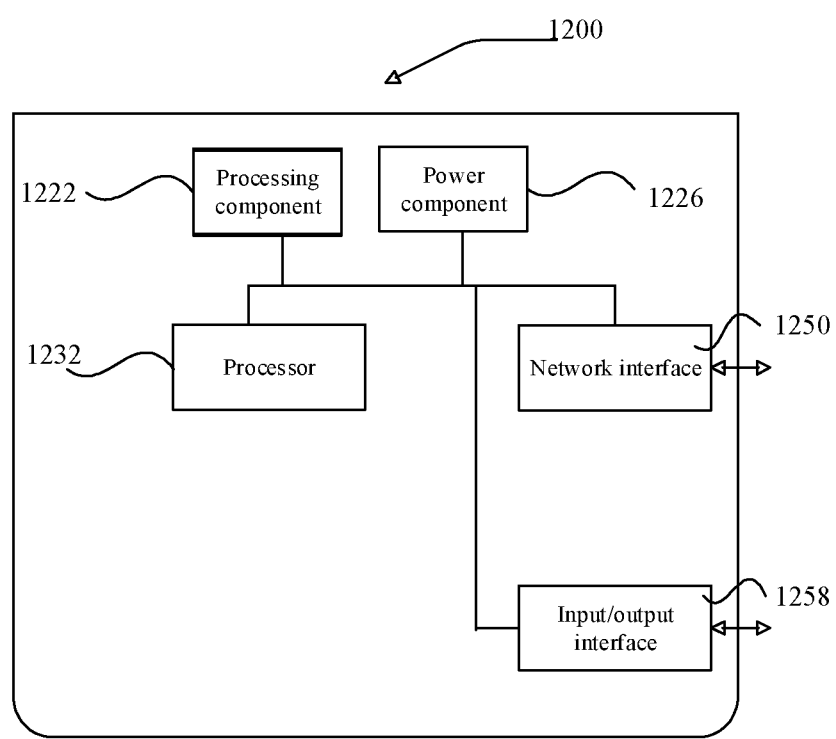
FIG. 12 is a block diagram II of a communication device according to an embodiment.

FIG. 12 illustrates a structure of a communication device 1200 according to an embodiment. The communication device may be the base station involved in the embodiments of the disclosure. For example, the communication device 1200 may be provided as a network device. As shown in FIG. 12, the communication device 1200 includes a processing assembly 1222, which further includes at least one processor, and a memory resource represented by a memory 1232 for storing instructions, such as applications, that may be executed by the processing component 1222. The applications stored in the memory 1232 may include one or more modules each corresponding to a set of instructions. In addition, the processing component 1222 is configured to execute the instructions to perform any of the methods described above and is applicable to the communication device.

The communication device 1200 may also include a power component 1226 configured to perform power management of the communication device 1200, a wired or wireless network interface 1250 configured to connect the communication device 1200 to a network, and an input/output (I/O) interface 1258. The communication device 1200 may operate based on an operating system stored in the memory 1232, such as Windows Server™, Mac OS X™, Unix™, Linux™, FreeBSD™, or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A cell handover or reselection method, performed by a terminal, comprising:
determining measurement information of a satellite cell based on relative location information between the terminal and a satellite, wherein the satellite cell comprises at least one of: a serving cell where the terminal is located or at least one candidate target cell, and the relative location information comprises at least one of followings: a first distance of a location of the terminal relative to a reference location of the serving cell; or a second distance of the location of the terminal relative to a reference location of the at least one candidate target cell;
determining the first distance being greater than or equal to a second distance threshold and the second distance being less than or equal to a third distance threshold, determining the measurement information; and
reporting the measurement information to a base station, wherein the measurement information is used by the base station to determine whether to perform conditional handover (CHO).

2. The method of claim 1, wherein the relative location information further comprises at least one of followings:
a first minimum elevation angle value of the terminal capable of receiving a satellite signal corresponding to the serving cell; or
a second minimum elevation angle value of the terminal capable of receiving a satellite signal corresponding to the at least one candidate target cell.

3. The method of claim 2, wherein determining the measurement information of the satellite cell based on the relative location information between the terminal and the satellite comprises at least one of:
determining the first distance being greater than or equal to a first distance threshold, determining the measurement information;
and/or,
determining the first minimum elevation angle value being less than or equal to a first minimum elevation angle threshold, determining the measurement information.

4. The method of claim 2, wherein determining the measurement information of the satellite cell based on the relative location information between the terminal and the satellite comprises:
determining the measurement information based on the relative location information and reference signal quality information, wherein the reference signal quality information comprises at least one of: reference signal quality information of the at least one candidate target cell or reference signal quality information of the serving cell.

5. The method of claim 4, wherein determining the measurement information of the satellite cell based on the relative location information between the terminal and the satellite and the reference signal quality information comprises at least one of:
determining the first distance being greater than or equal to the second distance threshold and the reference signal quality information of the at least one candidate target cell being greater than or equal to a preset first quality threshold, determining the measurement information;
and/or,
determining the first minimum elevation angle value being less than or equal to a first minimum elevation angle threshold and the reference signal quality information of the at least one candidate target cell being greater than or equal to the preset first quality threshold, determining the measurement information.

6. The method of claim 4, wherein determining the measurement information of the satellite cell based on the relative location information between the terminal and the satellite and the reference signal quality information comprises at least one of:
determining the second distance being less than or equal to the third distance threshold and the reference signal quality information of the serving cell being less than or equal to a preset second quality threshold, determining the measurement information;
or,
determining the second minimum elevation angle value being greater than or equal to a second minimum elevation angle threshold and the reference signal quality information of the serving cell being less than or equal to the preset second quality threshold, determining the measurement information.

7. The method of claim 1, further comprising:
receiving configuration information of the candidate target cell from a base station, wherein the configuration information of the candidate target cell is configured to configure the candidate target cell of the terminal for Conditional Handover CHO.

8. The method of claim 7, wherein the measurement information comprises: a handover request for requesting handover to the candidate target cell.

9. The method of claim 1, further comprising:
receiving configuration information of a measurement parameter sent by a base station; and
determining the relative location information based on the configuration information of the measurement parameter.

10. The method of claim 1, further comprising:
receiving a satellite position, a velocity, and time information PVT broadcasted by the satellite; and
determining the relative location information based on the PVT.

11. A communication device comprising: a processor and a memory for storing executable instructions capable of running on the processor, wherein,
the processor is configured to perform the cell handover or reselection method of claim 1 when running the executable instructions.

12. A cell handover or reselection method, performed by a base station, comprising:
receiving measurement information of a satellite cell transmitted by a terminal based on relative location information between the terminal and a satellite, wherein the measurement information is determined by the terminal when determining the first distance being greater than or equal to a second distance threshold and the second distance being less than or equal to a third distance threshold, and the measurement information is used by the base station to determine whether to perform conditional handover (CHO); wherein the satellite cell comprises at least one of: a serving cell where the terminal is located or at least one candidate target cell, and the relative location information comprises at least one of followings: a first distance of a location of the terminal relative to a reference location of the serving cell; or a second distance of the location of the terminal relative to a reference location of the at least one candidate target cell.

13. The method of claim 12, wherein the relative location information further comprises at least one of followings:
a first distance of a location of the terminal relative to a reference location of the serving cell; or
a second distance of the location of the terminal relative to a reference location of the at least one candidate target cell.

14. The method of claim 13, wherein receiving the measurement information of the satellite cell transmitted by the terminal based on the relative location information between the terminal and the satellite comprises at least one of:
determining the first distance being greater than or equal to a first distance threshold, receiving the measurement information transmitted by the terminal;
or,
determining the first minimum elevation angle value being less than or equal to a first minimum elevation angle threshold, receiving the measurement information transmitted by the terminal.

15. The method of claim 13, wherein receiving the measurement information of the satellite cell transmitted by the terminal based on the relative location information between the terminal and the satellite comprises:
receiving the measurement information transmitted by the terminal based on the relative location information and reference signal quality information, wherein the reference signal quality information comprises at least one of: reference signal quality information of the at least one candidate target cell or reference signal quality information of the serving cell.

16. The method of claim 15, wherein receiving the measurement information of the satellite cell transmitted by the terminal based on the relative location information between the terminal and the satellite and the reference signal quality information, comprises at least one of:
determining the first distance being greater than or equal to the second distance threshold and the reference signal quality information of the at least one candidate target cell being greater than or equal to a preset first quality threshold, receiving the measurement information transmitted by the terminal;
or,
determining the first minimum elevation angle value being less than or equal to a first minimum elevation angle threshold and the reference signal quality information of the at least one candidate target cell being greater than or equal to the preset first quality threshold, receiving the measurement information transmitted by the terminal.

17. The method of claim 15, wherein receiving the measurement information of the satellite cell transmitted by the terminal based on the relative location information between the terminal and the satellite and the reference signal quality information, comprises at least one of:
determining the second distance being less than or equal to the third distance threshold and the reference signal quality information of the serving cell being less than or equal to a preset second quality threshold, receiving the measurement information transmitted by the terminal;
or,
determining the second minimum elevation angle value being greater than or equal to a second minimum elevation angle threshold and the reference signal quality information of the serving cell being less than or equal to the preset second quality threshold, receiving the measurement information transmitted by the terminal.

18. The method of claim 12, further comprising:
sending configuration information of the candidate target cell, wherein the configuration information of the candidate target cell is configured to configure the candidate target cell of the terminal for CHO.

19. The method of claim 12, further comprising:
sending configuration information of a measurement parameter based on a coverage range of the satellite, wherein the configuration information of the measurement parameter is used for the terminal to determine the relative location information.

20. A communication device, at least comprising: a processor and a memory for storing executable instructions capable of running on the processor, wherein,
the processor is configured to perform the cell handover or reselection method of claim 12 when running the executable instructions.

21. A cell handover or reselection method, performed by a terminal, comprising:
determining reference signal quality information of a serving cell satisfying a condition;
determining a first distance being greater than or equal to a first distance threshold and the second distance being less than or equal to a third distance threshold, wherein the first distance is a distance between a location of the terminal and a reference point of the serving cell, and the second is a distance between the location of the terminal and a reference point of at least one candidate target cell; and
determining measurement information of the at least one candidate target cell; wherein determining the measurement information of the at least one candidate target cell comprises: determining the measurement information of the at least one candidate target cell based on relative location information between the terminal and the at least one candidate target cell; wherein the relative location information comprises the second distance;
reporting the measurement information to a base station, wherein the measurement information is used by the base station to determine whether to perform conditional handover (CHO).

22. The method of claim 21, further comprising:
determining reference signal quality information of the at least one candidate target cell being greater than or equal to a first quality threshold.

23. The method of claim 21, further comprising:
determining unable to obtain the first distance or the first distance being smaller than the first distance threshold; and
determining not performing measurement for obtain the measurement information.

24. The method of claim 21, wherein the measurement information comprises: a reference signal receiving power (RSRP), a reference signal receiving quality (RSRQ), a signal to interference plus noise ratio (SINR).

25. The method of claim 21, further comprising at least one of:
performing cell reselection to the at least one candidate target cell;
or,
performing handover to the at least one candidate target cell.

26. A communication device, at least comprising: a processor and a memory for storing executable instructions capable of running on the processor, wherein,
the processor is configured to perform the cell handover or reselection method of claim 21 when running the executable instructions.

* * * * *